United States Patent
Ait Sab et al.

(10) Patent No.: US 10,833,766 B2
(45) Date of Patent: Nov. 10, 2020

(54) MONITORING EQUIPMENT FOR AN OPTICAL TRANSPORT SYSTEM

(71) Applicant: Alcatel Submarine Networks, Nozay (FR)

(72) Inventors: Omar Ait Sab, Arpajon (FR); Victor Faraci, Limours (FR)

(73) Assignee: ALCATEL SUBMARINE NETWORKS, Nozay (FR)

( * ) Notice: Subject to any disclaimer, the term of this patent is extended or adjusted under 35 U.S.C. 154(b) by 0 days.

(21) Appl. No.: 16/520,684

(22) Filed: Jul. 24, 2019

(65) Prior Publication Data
US 2020/0036447 A1  Jan. 30, 2020

(30) Foreign Application Priority Data
Jul. 25, 2018 (EP) .................................... 18306007

(51) Int. Cl.
*H04J 14/02* (2006.01)
*H04B 10/40* (2013.01)
(Continued)

(52) U.S. Cl.
CPC ............. *H04B 10/40* (2013.01); *H04B 10/29* (2013.01); *H04J 14/0212* (2013.01); *H04B 10/0775* (2013.01)

(58) Field of Classification Search
CPC .... H04B 10/29; H04B 10/40; H04B 10/0775; H04J 14/0212
See application file for complete search history.

(56) References Cited

U.S. PATENT DOCUMENTS

| 5,469,428 A | 11/1995 | Tokura et al. |
| 6,522,796 B1 | 2/2003 | Ziari et al. |

(Continued)

FOREIGN PATENT DOCUMENTS

| EP | 0981215 A2 | 2/2000 |
| EP | 1035669 A1 | 9/2000 |

(Continued)

OTHER PUBLICATIONS

Bao, Xiaoyi et al., "Recent progress in distributed fiber optic sensors." sensors 12.7, (2012). pp. 8601-8639.

(Continued)

*Primary Examiner* — Dzung D Tran
(74) *Attorney, Agent, or Firm* — Mendelsohn Dunleavy, P.C.; Yuri Gruzdkov

(57) ABSTRACT

A landing station whose monitoring equipment employs a depolarized light source for generating the supervisory optical signals that are used to monitor certain performance characteristics of the corresponding submerged fiber-optic cable plant. In some embodiments, the depolarized light source operates to provide amplified spontaneous emission (ASE) within the bandwidths of the supervisory wavelength channels, with the supervisory optical signals being generated by modulating the provided ASE. In some other embodiments, the depolarized light source operates to generate a supervisory optical signal by modulating two carrier waves having (i) mutually orthogonal polarizations and (ii) different respective carrier wavelengths both of which are within the bandwidth of the corresponding supervisory wavelength channel. The use of such depolarized light sources can advantageously reduce the negative impact of the supervisory wavelength channels on the payload wavelength channels with respect to that observed under at least some conventional monitoring schemes.

15 Claims, 9 Drawing Sheets

(51) Int. Cl.
*H04B 10/29* (2013.01)
*H04B 10/077* (2013.01)

(56) References Cited

U.S. PATENT DOCUMENTS

| | | | |
|---|---|---|---|
| 6,671,464 B1 * | 12/2003 | Kikuchi | H04B 10/2569 |
| | | | 385/11 |
| 6,708,004 B1 * | 3/2004 | Homsey | H04B 10/035 |
| | | | 398/11 |
| 7,068,945 B2 | 6/2006 | Ogiwara et al. | |
| 7,099,581 B2 | 8/2006 | Evangelides, Jr. et al. | |
| 7,872,738 B2 | 1/2011 | Abbott | |
| 7,885,539 B2 | 2/2011 | Leppla et al. | |
| 8,009,983 B2 | 8/2011 | Zhang | |
| 8,135,274 B2 | 3/2012 | Zhang et al. | |
| 8,280,253 B2 | 10/2012 | Genay et al. | |
| 8,502,964 B2 | 8/2013 | Wang et al. | |
| 8,559,813 B2 | 10/2013 | Harman | |
| 8,676,053 B2 | 3/2014 | Wang et al. | |
| 8,805,183 B2 | 8/2014 | Dvir | |
| 8,837,938 B2 | 9/2014 | Liu et al. | |
| 8,942,556 B2 | 1/2015 | Zhao et al. | |
| 9,008,503 B2 | 4/2015 | Urban et al. | |
| 9,036,991 B2 | 5/2015 | Aguren | |
| 9,042,721 B2 | 5/2015 | Randel et al. | |
| 9,130,672 B2 | 9/2015 | Zhang | |
| 9,143,228 B2 | 9/2015 | Sandstrom | |
| 9,154,258 B1 | 10/2015 | Mertz et al. | |
| 9,170,173 B2 | 10/2015 | Perron et al. | |
| 9,240,836 B1 | 1/2016 | Chen | |
| 9,276,672 B2 | 3/2016 | Zhang et al. | |
| 9,310,274 B2 | 4/2016 | Nagel et al. | |
| 9,341,543 B2 | 5/2016 | Viswanathan | |
| 9,960,845 B2 | 5/2018 | Ngo et al. | |
| 2002/0131099 A1 | 9/2002 | Harasawa | |
| 2004/0146305 A1 | 7/2004 | Neubelt et al. | |
| 2004/0161244 A1 | 8/2004 | Yokoyama et al. | |
| 2004/0201882 A1 * | 10/2004 | Kikuchi | H04B 10/2916 |
| | | | 359/341.43 |
| 2005/0259998 A1 | 11/2005 | Fujieda et al. | |
| 2006/0251423 A1 | 11/2006 | Evangelides, Jr. et al. | |
| 2007/0115456 A1 | 5/2007 | Wisseman | |
| 2007/0201873 A1 | 8/2007 | Buabbud et al. | |
| 2008/0050120 A1 | 2/2008 | Neubelt | |
| 2009/0324249 A1 | 12/2009 | Zhang | |
| 2010/0322627 A1 | 12/2010 | Desbruslais et al. | |
| 2011/0216996 A1 | 9/2011 | Rogers | |
| 2012/0136660 A1 | 5/2012 | Harman et al. | |
| 2012/0257899 A1 | 10/2012 | Richardson et al. | |
| 2013/0004162 A1 * | 1/2013 | Osaka | H04B 10/2572 |
| | | | 398/34 |
| 2013/0216176 A1 | 8/2013 | Li et al. | |
| 2014/0212130 A1 | 7/2014 | Urban et al. | |
| 2014/0212131 A1 | 7/2014 | Zhang | |
| 2015/0155934 A1 * | 6/2015 | Nakagawa | H04B 10/0775 |
| | | | 398/34 |
| 2015/0171958 A1 | 6/2015 | Webb et al. | |
| 2016/0099851 A1 | 4/2016 | Archambault et al. | |
| 2016/0261340 A1 * | 9/2016 | Yang | H04B 10/07953 |
| 2017/0359127 A1 * | 12/2017 | Moeller | H04B 10/532 |

FOREIGN PATENT DOCUMENTS

| | | |
|---|---|---|
| EP | 1591768 A1 | 11/2005 |
| EP | 2088697 A1 | 8/2009 |
| EP | 2685641 A1 | 1/2014 |
| EP | 3076565 A1 | 10/2016 |
| EP | 3404852 A1 | 11/2018 |
| EP | 3404855 A1 | 11/2018 |
| EP | 3439200 A1 | 2/2019 |
| JP | 03042927 A | 2/1991 |
| WO | 2017168994 A1 | 10/2017 |
| WO | 2018210470 A1 | 11/2018 |

OTHER PUBLICATIONS

ITU-T Telecommunication Standard "G_694.1—Spectral grids for WDM applications: DWDM frequency grid", International Telecommunication Union, Feb. 2012 (16 pages).

Moeller, Lothar, et al. "Mitigating Nonlinear Crosstalk from In-service Line Monitoring Equipment for Undersea Communication Systems." 2017 European Conference on Optical Communication (ECOC). IEEE, 2017. 3 pages.

Extended European Search Report for corresponding European application No. 18306007.8, dated Feb. 21, 2019.

Kim, Hyun Deok et al."A low-cost WDM source with an ASE injected Fabry-Perot semiconductor laser." IEEE Photonics Technology Letters 12.8 (2000): 1067-1069.

Corresponding European Application No. EP18306007.8 "Monitoring Equipment for an Optical Transport System", filed Jul. 25, 2018, (43 pages).

European Application No. 19305187.7 "Symmetrical Supervisory Optical Circuit for a Bidirectional Optical Repeater", filed Feb. 15, 2019, (38 pages).

European Application No. 19305867.4 "Technique for Monitoring Optical Paths", filed Jun. 27, 2019, (54 pages).

White Paper "Line Monitoring and Control in Subsea Networks", www.Xtera.com, 2017 [retrieved on Sep. 20, 2019] Retrieved from the Internet: <URL: https://www.xtera.com/wp-content/uploads/2017/05/White-Paper-Line-Monitoring-and-Control-in-Subsea-Networks-Xtera-August-2016.pdf> (8 pages).

ITU-T Telecommunication Standard "G.979—Characteristics of monitoring systems for optical submarine cable systems", International Telecommunication Union, Nov. 2016 (16 pages).

Chen, Hongxin et al."Reduction of the impairment of online OTDR monitoring by use of a narrow bandwidth OTDR and an optical bandpass filter." IEEE Photonics Technology Letters 16.9 (2004): pp. 2198-2200.

European Application No. EP19305972.2 "Technique for Monitoring Optical Paths", filed Jul. 23, 2019, (27 pages).

* cited by examiner

100

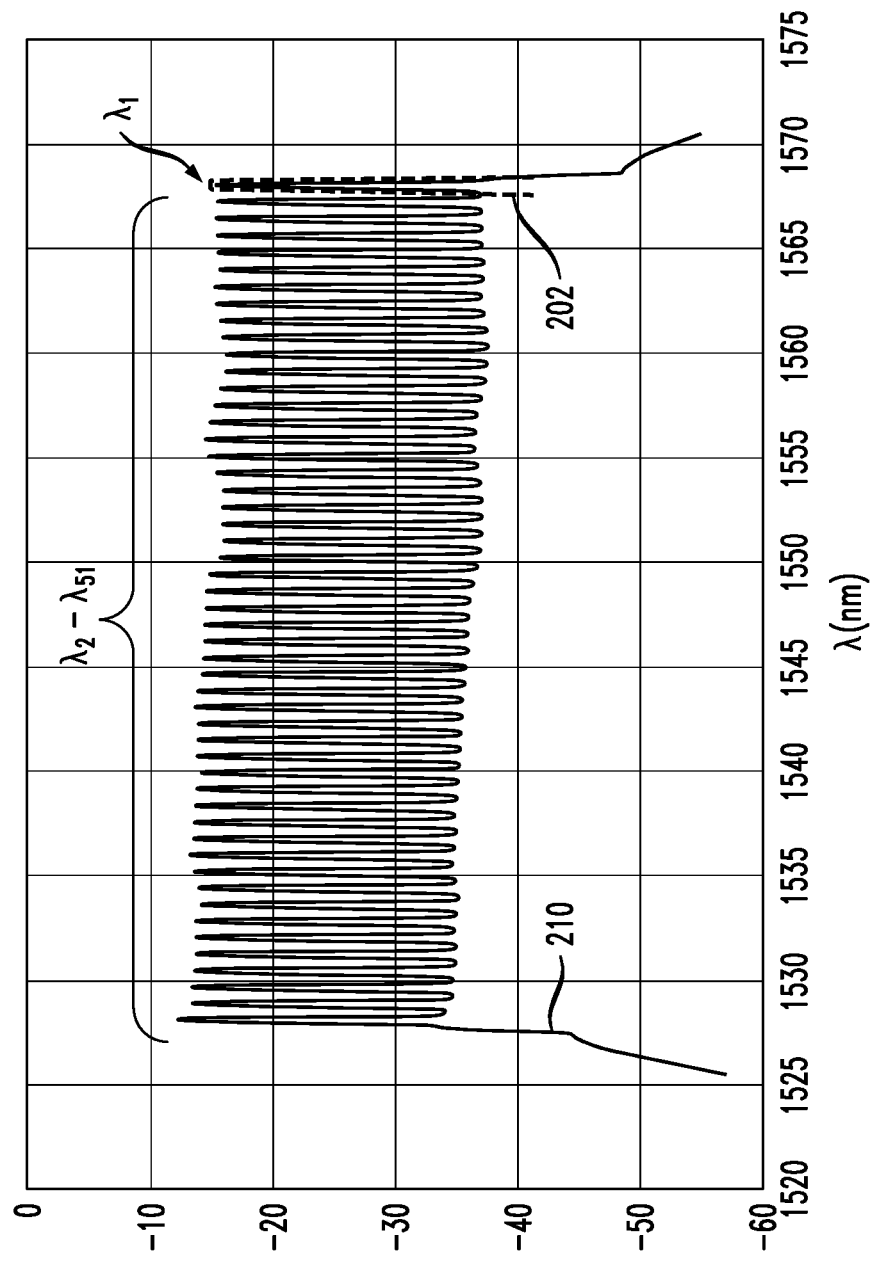

400

420

420

420

420

900

1000

MONITORING EQUIPMENT FOR AN OPTICAL TRANSPORT SYSTEM

BACKGROUND

Field

Various example embodiments relate to optical communication equipment and, more specifically but not exclusively, to monitoring equipment for an optical transport system.

Description of the Related Art

This section introduces aspects that may help facilitate a better understanding of the disclosure. Accordingly, the statements of this section are to be read in this light and are not to be understood as admissions about what is in the prior art or what is not in the prior art.

Subsea network operators are facing a fast growth in bandwidth demand, in part due to the development and deployment of cloud-based services. As a result, they need to optimize the capacity and performance of their fiber-optic cable plants to enable the corresponding networks to efficiently handle the increasing data flows. Due to this need, one of the requirements to telecom equipment manufacturers is to provide the network operator(s) with a supervisory system that can be used to monitor the status of the submerged plant elements, e.g., to guarantee fault detection and diagnostics, improved maintainability, good performance characteristics throughout the plant's lifespan, upgradable capacity, and/or any other pertinent benchmarks. It is also desirable for the supervisory system to be amenable to a low-cost implementation.

SUMMARY OF SOME SPECIFIC EMBODIMENTS

Disclosed herein are various embodiments of a landing station whose monitoring equipment employs a depolarized light source for generating the supervisory optical signals that are used to monitor certain performance characteristics of the corresponding submerged fiber-optic cable plant. In some embodiments, the depolarized light source operates to provide amplified spontaneous emission (ASE) within the bandwidths of the supervisory wavelength channels, with the supervisory optical signals being generated by modulating the provided ASE. In some other embodiments, the depolarized light source operates to generate a supervisory optical signal by modulating two carrier waves having (i) mutually orthogonal polarizations and (ii) different respective carrier wavelengths both of which are within the bandwidth of the corresponding supervisory wavelength channel. The use of such depolarized light sources can advantageously reduce the negative impact of the supervisory wavelength channels on the payload wavelength channels with respect to that observed under at least some conventional monitoring schemes.

According to one example embodiment, provided is an apparatus comprising: an optical output and an optical input; a first optical transmitter connected to the optical output to transmit therethrough a first modulated optical signal carrying light spectrally located within a bandwidth of a first wavelength channel; and a first optical receiver connected to the optical input to receive therethrough a delayed portion of the first modulated optical signal; and wherein the first optical transmitter comprises: a first light source configured to generate light comprising amplified spontaneous emission; a first band-pass filter configured to generate a first optical beam by passing through a spectral portion of the amplified spontaneous emission located within the bandwidth of the first wavelength channel; and a first optical modulator configured to generate the first modulated optical signal by modulating the first optical beam.

According to another example embodiment, provided is an apparatus comprising: an optical output and an optical input; a first optical transmitter connected to the optical output to transmit therethrough a first modulated optical signal carrying light spectrally located within a bandwidth of a first wavelength channel; and a first optical receiver connected to the optical input to receive therethrough a delayed portion of the first modulated optical signal; and wherein the first optical transmitter comprises: a first laser configured to generate a first optical beam having a first carrier wavelength within the bandwidth of the first wavelength channel, the first optical beam having a first polarization; and a second laser configured to generate a second optical beam having a second carrier wavelength within the bandwidth of the first wavelength channel, the first optical beam having a second polarization that is orthogonal to the first polarization; and wherein the first optical transmitter is configured to generate the first modulated optical signal using the first and second optical beams.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 2A-2B graphically illustrate certain spectral characteristics of an example optical filter that can be used in the optical transport system of FIG. 1 according to an embodiment;

DETAILED DESCRIPTION

Some embodiments may benefit from the use of at least some features disclosed in (i) European Patent Application Nos. EP17305569.0 and EP17305570.8, both filed on 17 May 2017, and (ii) International Patent Application No. PCT/EP2018/056770 filed on 16 Mar. 2018, all of which are incorporated herein by reference in their entirety.

Figure 1:
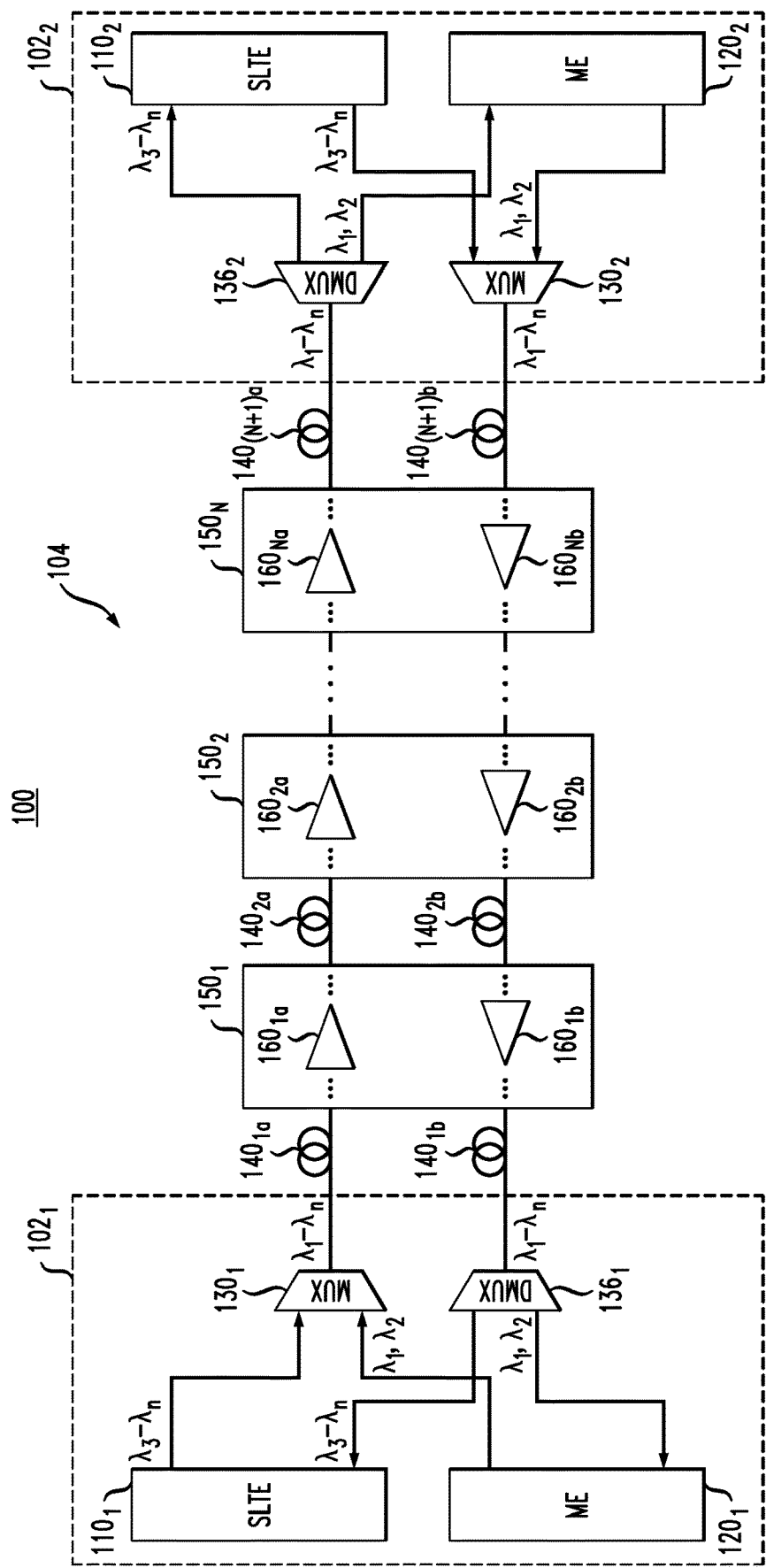
FIG. 1 shows a block diagram of an optical transport system according to an embodiment.

FIG. 1 shows a block diagram of an optical transport system 100 according to an embodiment. In the shown embodiment, system 100 comprises landing stations 102$_1$ and 102$_2$ connected by way of a wet plant 104. Landing stations 102$_1$ and 102$_2$ are typically further connected to respective terrestrial networks (not explicitly shown in FIG. 1). In an alternative embodiment, system 100 may have additional landing stations connected to wet plant 104, as known in the pertinent art, e.g., using one or more branching units (not explicitly shown in FIG. 1).

In an example embodiment, wet plant 104 comprises an undersea cable system that includes, inter alia, submersible optical repeaters 150$_1$-150$_N$ serially connected by spans 140 of optical fiber, e.g., as indicated in FIG. 1, where N is a positive integer. In the shown embodiment, each span 140$_i$ includes two optical fibers, which are labeled 140$_{ia}$ and 140$_{ib}$, respectively, where i=1, 2, . . . , N+1. The number N of optical repeaters 150 used in wet plant 104 depends on the particular embodiment and may be in the range, e.g., from 1 to ~300. A typical length of a fiber span 140$_i$ may range from ~50 km to ~130 km, depending on the distance between landing stations 102$_1$ and 102$_2$.

In the shown embodiment, an optical repeater 150$_j$ comprises optical amplifiers 160$_{ja}$ and 160$_{jb}$, where j=1, 2, . . . , N. Optical amplifier 160$_{ja}$ is configured to amplify optical signals traveling towards landing station 102$_2$. Optical amplifier 160$_{jb}$ is similarly configured to amplify optical signals traveling towards landing station 102$_1$. In an example embodiment, an optical amplifier 160$_j$ can be implemented as known in the pertinent art, e.g., using an erbium-doped fiber, a gain-flattening filter, and one or more laser-diode pumps. The laser diodes can be powered by a DC current from the corresponding shore-based power-feeding equipment (PFE, not explicitly shown in FIG. 1), fed through the center conductor(s) of the corresponding submarine cable, which also typically contains optical fibers 140$_{ia}$ and 140$_{ib}$.

In an alternative embodiment, optical repeaters 150 can be designed for two, three, four, or more pairs of optical fibers 140$_i$ connected thereto at each side thereof. For example, an optical repeater 150 designed to be compatible with a four-fiber-pair submarine cable typically includes eight optical amplifiers 160 arranged in four amplifier pairs, each pair being similar to the pair of optical amplifiers 160$_{ja}$ and 160$_{jb}$.

Optical repeater 150$_j$ further comprises a supervisory optical circuit (not explicitly shown in FIG. 1; e.g., see FIG. 3) that enables monitoring equipment (ME) units 120$_1$ and 120$_2$ located at landing stations 102$_1$ and 102$_2$, respectively, to monitor the operating status of the optical repeaters, e.g., as further described below. Additional example embodiments of the supervisory optical circuit that can be used in an optical repeater 150$_j$ are disclosed in the above-cited European Patent Application Nos. EP17305569.0 and EP17305570.8 and International Patent Application No. PCT/EP2018/056770.

In an example embodiment, each of ME units 120$_1$ and 120$_2$ is configured to use dedicated supervisory wavelength channels (e.g., having center wavelengths that are labeled $\lambda_1$ and $\lambda_2$) to carry respective supervisory signals that can be sent through the corresponding fiber(s) 140 towards the remote landing station 102. The supervisory optical circuit of each optical repeater 150$_j$ is configured to loop back, in the opposite direction, at least a portion of a supervisory signal. As a result, ME unit 120$_1$ can receive a looped-back supervisory signal comprising the portions of the original supervisory signal returned to that ME unit by the different supervisory optical circuits of different optical repeaters 150$_1$-150$_N$. Similarly, ME unit 120$_2$ can receive a looped-back supervisory signal comprising the portions of the corresponding supervisory signal returned to that ME unit by the different supervisory optical circuits of different optical repeaters 150$_1$-150$_N$. The looped-back supervisory signals received by ME units 120$_1$ and 120$_2$ can be processed and analyzed to determine the present operating status and/or certain operating characteristics of at least some or all of optical repeaters 150$_1$-150$_N$ in wet plant 104. The determined parameters may include but are not limited to: (i) input and output signal levels and the gains of some or all individual optical amplifiers 160$_{ja}$ and 160$_{jb}$; (ii) non-catastrophic faults in individual optical fibers 140$_i$, such as any gradual loss increases therein; and (iii) catastrophic failures in individual optical repeaters 150$_j$ and/or optical fibers 140$_i$.

Landing station 102$_1$ comprises a submarine line terminal equipment (SLTE) unit 110$_1$ and ME unit 120$_1$ connected to wet plant 104 by way of a wavelength multiplexer (MUX) 130$_1$ and a wavelength de-multiplexer (DMUX) 136$_1$ as indicated in FIG. 1. In an example embodiment, SLTE unit 110$_1$ includes a wavelength-division-multiplexing (WDM) transceiver (not explicitly shown in FIG. 1) configured to transmit and receive payload-carrying optical signals using carrier wavelengths $\lambda_3$-$\lambda_n$, where n generally denotes the number of WDM channels in system 100. The number n can be in the range between ~10 and ~150.

As already indicated above, the wavelength channels having center wavelengths $\lambda_1$ and $\lambda_2$ are reserved for supervisory signals and are not used by SLTE unit 110$_1$ for payload transmissions. Wavelengths $\lambda_1$ and $\lambda_2$ can be spectrally located at an edge of the spectral range occupied by the payload-carrying WDM channels. For example, in some embodiments, both wavelengths $\lambda_1$ and $\lambda_2$ can be smaller than any of carrier wavelengths $\lambda_3$-$\lambda_n$. In some other embodiments, both wavelengths $\lambda_1$ and $\lambda_2$ can be larger than any of carrier wavelengths $\lambda_3$-$\lambda_n$. In some alternative embodiments, wavelength $\lambda_1$ can be smaller than any of carrier wavelengths $\lambda_3$-$\lambda_n$, and wavelength $\lambda_2$ can be larger than any of carrier wavelengths $\lambda_3$-$\lambda_n$.

In an example embodiment, wavelengths $\lambda_a$-$\lambda_n$ can be selected in accordance with a frequency (wavelength) grid, such as a frequency grid that complies with the ITU-T G.694.1 Recommendation, which is incorporated herein by reference in its entirety. The frequency grid used in system 100 can be defined, e.g., in the frequency range from about 184 THz to about 201 THz, with a 100, 50, 25, or 12.5-GHz spacing of the channels therein. While typically defined in frequency units, the parameters of the grid can equivalently be expressed in wavelength units. For example, in the wavelength range from about 1528 nm to about 1568 nm, the 100-GHz spacing between the centers of neighboring WDM channels is equivalent to approximately 0.8-nm spacing. In alternative embodiments, other fixed or flexible (flex) frequency grids can be used as well.

In operation, MUX 130$_1$ multiplexes the optical signals of carrier wavelengths $\lambda_3$-$\lambda_n$ generated by SLTE unit 110$_1$ and the supervisory optical signals carried by the wavelength channels $\lambda_1$ and $\lambda_2$, and applies the resulting multiplexed optical signal to optical fiber 140$_{1a}$. DMUX 136$_1$ de-multiplexes a multiplexed optical signal received from optical fiber 140$_{1b}$ into two portions. The first portion has optical signals of carrier wavelengths $\lambda_3$-$\lambda_n$ and is directed to SLTE unit $110_1$. The second portion has the looped-back supervisory optical signals carried by the wavelength channels $\lambda_1$ and $\lambda_2$ and is directed to ME unit $120_1$.

In an example embodiment, ME unit $120_1$ comprises an optical time-domain reflectometer (OTDR, not explicitly shown in FIG. 1) configured to optically probe wet plant 104 using wavelength channels $\lambda_1$ and $\lambda_2$. For example, ME unit $120_1$ can be designed to perform OTDR measurements by detecting and processing the looped-back supervisory optical signals received from optical repeaters $150_1$-$150_N$. In general, ME unit $120_1$ can be configured to use any suitable OTDR method. Some embodiments of ME unit $120_1$ may benefit from the use of at least some OTDR features and/or techniques disclosed, e.g., in U.S. Pat. Nos. 9,341,543, 9,310,274, 9,240,836, 9,170,173, 9,143,228, 9,042,721, 9,036,991, 9,008,503, 8,942,556, 8,837,938, 8,805,183, 8,502,964, and 8,280,253 and U.S. Patent Application Publication Nos. 2011/0216996, 2013/0216176, and 2014/0212130, all of which are incorporated herein by reference in their entirety. The general physical principles of different types of OTDR measurements are reviewed, e.g., in Xiaoyi Bao and Liang Chen, "Recent Progress in Distributed Fiber Optic Sensors," Sensors, 2012, vol. 12, pp. 8601-8639, which is also incorporated herein by reference in its entirety.

Landing station $102_2$ is analogous to landing station $102_1$ and comprises an SLTE unit $110_2$, ME unit $120_2$, a MUX $130_2$, and a DMUX $136_2$. The analogous elements/components of the two landing stations are labeled in FIG. 1 using the same numerical labels, but with different respective subscripts. The descriptions of SLTE unit $110_1$, ME unit $120_1$, MUX $130_1$, and DMUX $136_1$ of landing station $102_1$ given above generally apply to SLTE unit $110_2$, ME unit $120_2$, MUX $130_2$, and DMUX $136_2$, respectively, of landing station $102_2$ and are not repeated here.

In various embodiments, each of landing stations $102_1$ and $102_2$ may further include one or more of the following conventional elements/components: (i) power feeding equipment; (ii) system supervisory equipment; (iii) network management equipment; (iv) cable termination boxes; (v) network protection equipment; and (vi) various interface circuits.

In some embodiments, a single respective wavelength channel can be used at each of ME units $120_1$ and $120_2$ for respective supervisory optical signals. In some embodiments, more than one carrier wavelength per wavelength channel can be used for supervisory functions, e.g., as described in more detail below. In some embodiments, optical waves having "noise-like" characteristics can be used for supervisory functions, e.g., as described in more detail below.

In some embodiments, a supervisory optical circuit of optical repeater $150_1$ can be implemented using wavelength-selective reflectors (not explicitly shown in FIG. 1), e.g., as described in the above-cited European Patent Application No. EP17305570.8. In some embodiments, a supervisory optical circuit of optical repeater $150_1$ can be implemented using narrow band-pass optical filters (NBPOFs, not explicitly shown in FIG. 1, see FIGS. 2-3).

Figure 3:
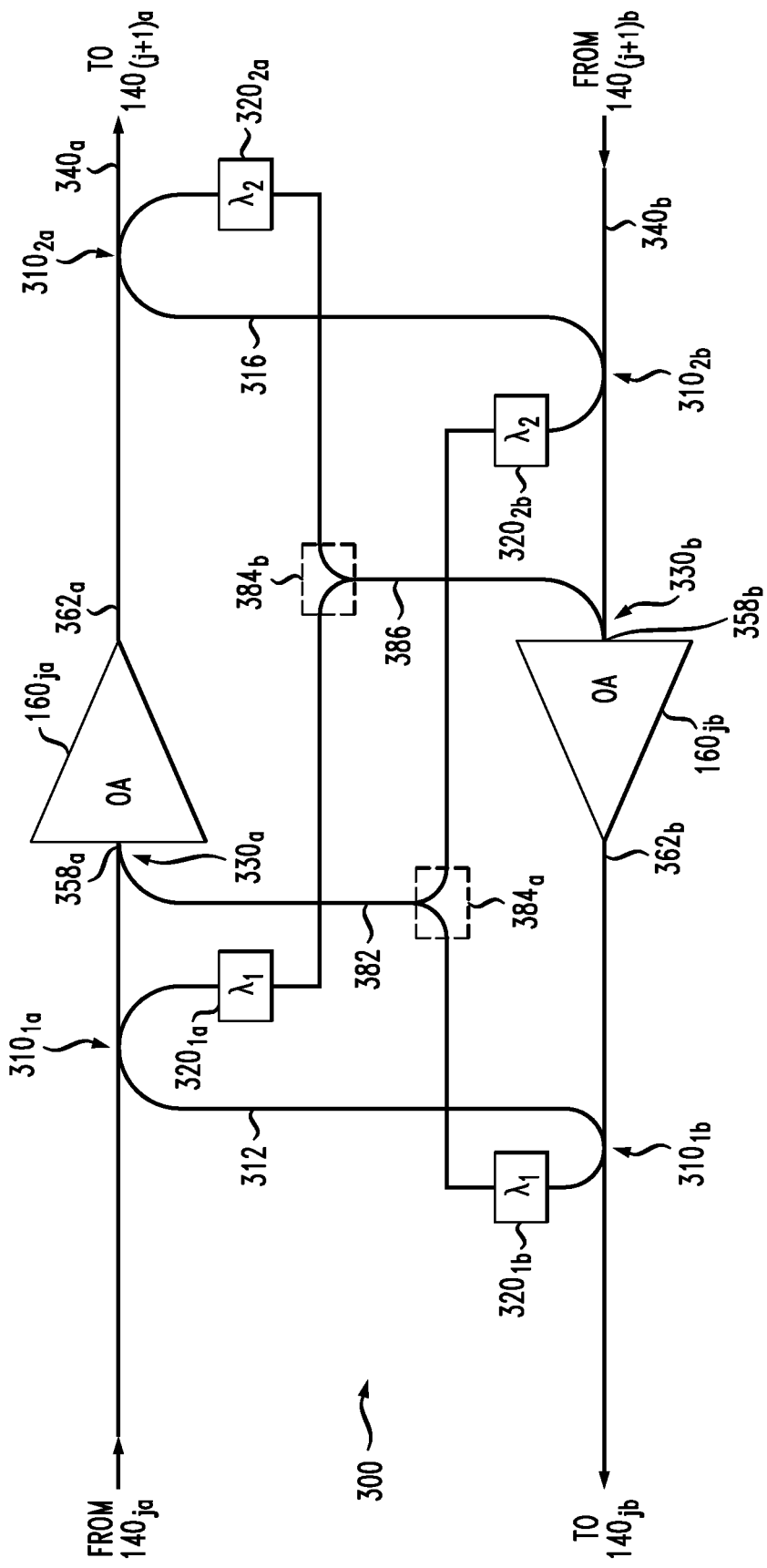
FIG. 3 shows a block diagram of an optical repeater that can be used in the optical transport system of FIG. 1 according to an embodiment.
Figure 8:
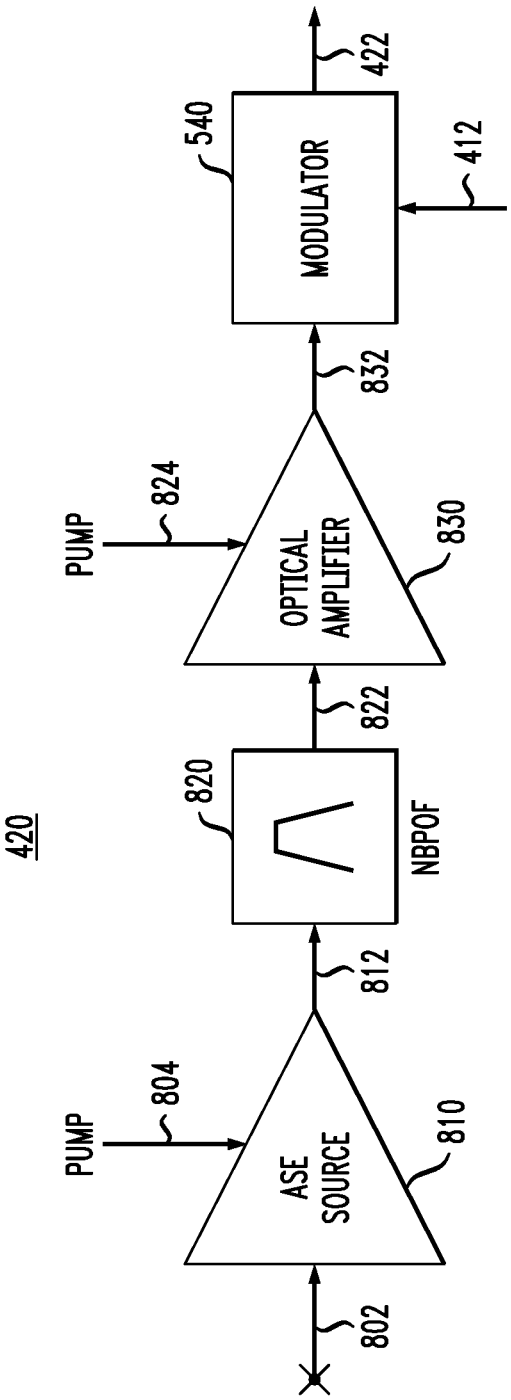
FIG. 8 shows a block diagram of an optical transmitter that can be used in the optical transceiver of FIG. 4 according to yet another embodiment.
Figure 9:
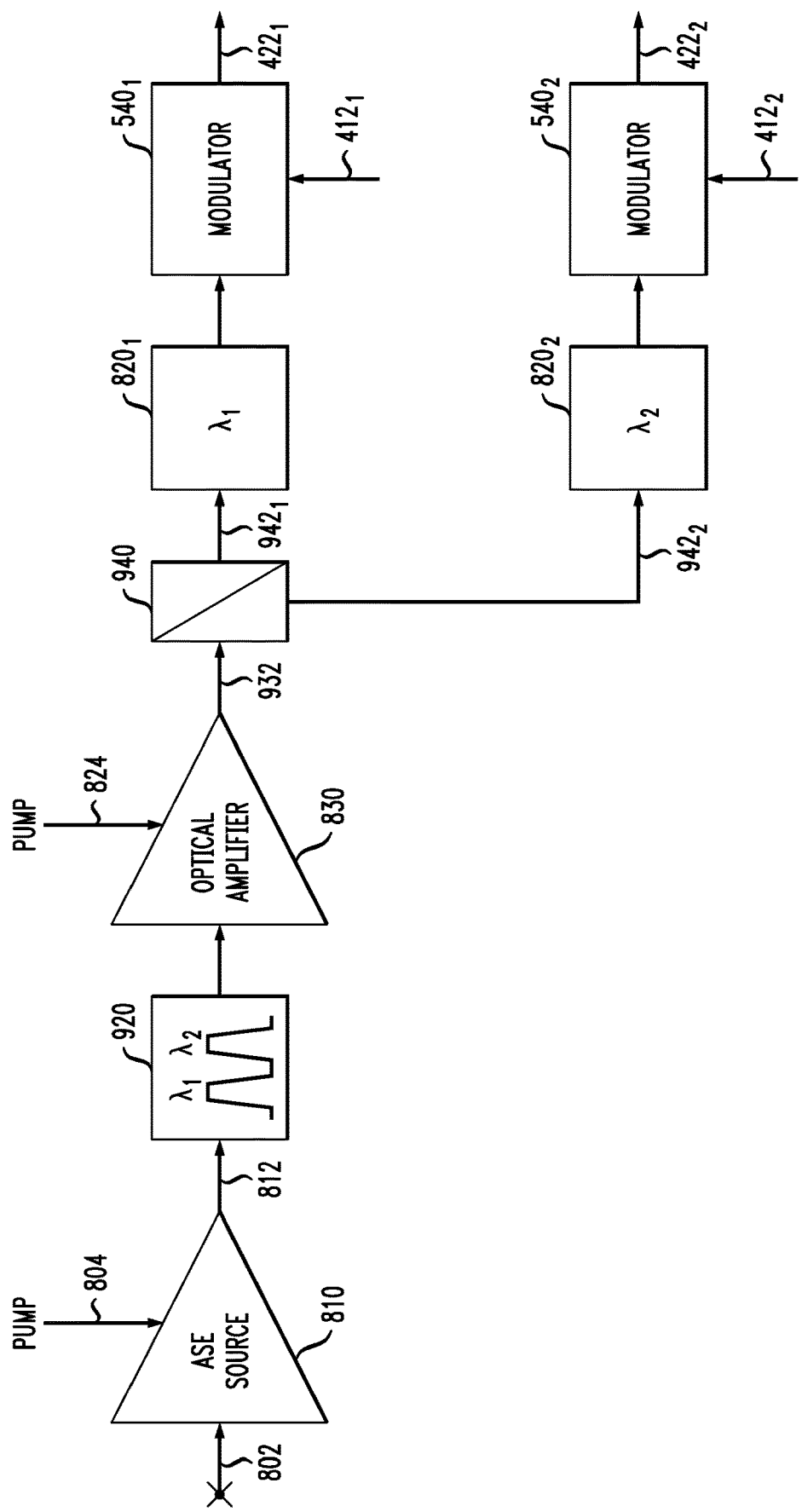
FIG. 9 shows a block diagram of an optical transmitter that can be used in the optical transceiver of FIG. 4 according to yet another embodiment.

In an example embodiment, at least some light sources, OTDRs, and/or optical transceivers used in ME units $120_1$ and $120_2$ can be implemented using NBPOFs (not explicitly shown in FIG. 1; see, e.g., FIGS. 3, 8, 9).

As used herein the term "narrow band-pass optical filter" refers to an optical device that passes optical frequencies (wavelengths) within a certain relatively narrow spectral range and rejects (or strongly attenuates) optical frequencies outside that spectral range. The bandwidth B of the narrow band-pass optical filter is much smaller than any of the carrier frequencies that are being passed therethrough. For example, a center frequency of the pass band can be ~200 THz, whereas the bandwidth B can be ~100 GHz, which is approximately three orders of magnitude smaller.

The planar-lightwave-circuit (PLC) technology enables telecom equipment manufacturers to produce narrow band-pass optical filters in large quantities and/or relatively inexpensively. There are many mature filter designs from which the manufacturer can choose for the intended application. In addition, a PLC-based narrow band-pass optical filter can be made tunable in a relatively straightforward manner, without an expensive and/or time-consuming redesign.

Figure 2A:
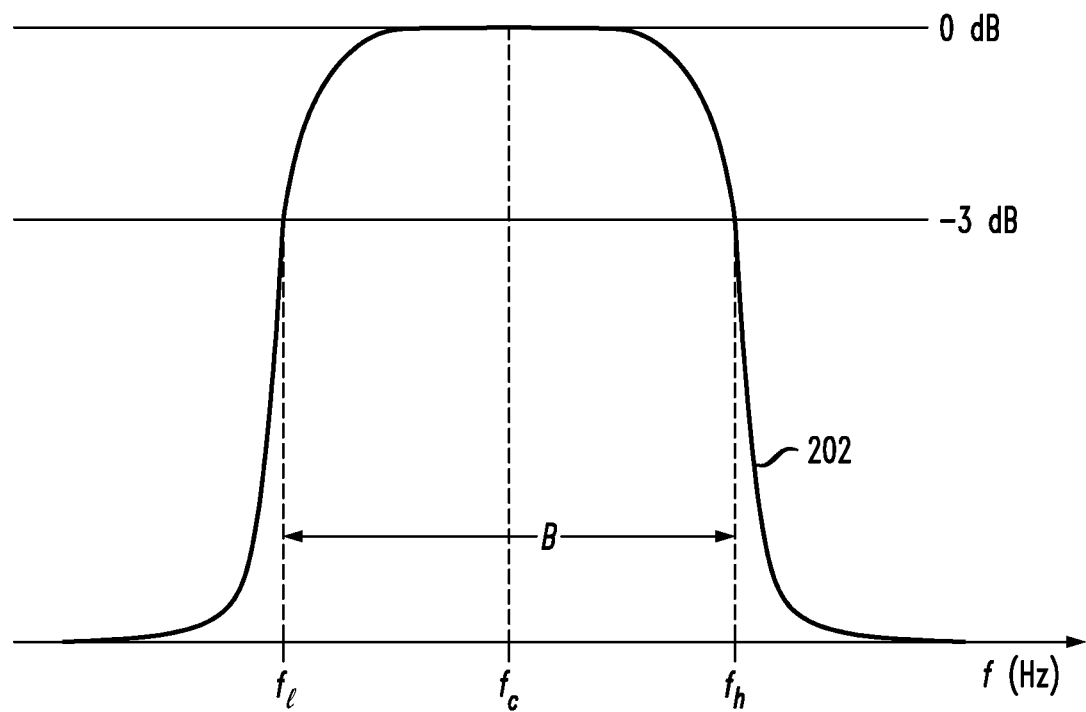

FIGS. 2A-2B graphically illustrate certain spectral characteristics of an example narrow band-pass optical filter that can be used in the supervisory optical circuit of optical repeater $150_j$ and/or an ME unit 120 according to an embodiment. More specifically, FIG. 2A graphically shows a magnitude transfer function 202 versus frequency for a narrow band-pass optical filter. FIG. 2B graphically shows the spectral alignment of transfer function 202 with a spectrum 210 of an example WDM signal that can be transmitted in system 100.

Referring to FIG. 2A, marked on the abscissa are (i) the center frequency $f_c$ of transfer function 202 and (ii) the frequencies $f_l$ and $f_h$ of the half-power points (gain –3 dB relative to the center portion) of transfer function 202. The bandwidth B of transfer function 202 can typically be defined as the difference between the frequencies $f_h$ and $f_l$, although an alternative definition is also possible.

Depending on the embodiment, the bandwidth B can be, e.g., 100, 50, 25, or 12.5 GHz. Other values of the bandwidth B can also be used, as long as the selected bandwidth value is compatible with the system's WDM configuration and/or WDM-channel assignment, e.g., as further illustrated in FIG. 2B.

The center frequency $f_c$ can belong to any telecom band. As known to those skilled in the pertinent art, the frequencies (wavelengths) used for optical communications are conventionally divided into several spectral bands in which optical fibers have relatively low transmission losses. For example, the spectral range between 1260 nm and 1625 nm is divided into five telecom bands that are typically referred to as O-, E-, S-, C-, and L-bands. The O-band is in the wavelength range between 1260 nm and 1360 nm. The E-band is in the wavelength range between 1360 nm and 1460 nm. The S-band is in the wavelength range between 1460 nm and 1528 nm. The C-band is in the wavelength range between 1528 nm and 1568 nm. The L-band is in the wavelength range between 1568 nm and 1625 nm.

Referring to FIG. 2B, spectrum 210 has fifty-one peaks corresponding to wavelength channels $\lambda_1$-$\lambda_{51}$ (i.e., n=51). Transfer function 202 is illustratively shown as being spectrally aligned with the peak corresponding to wavelength channel $\lambda_1$, which is one of the dedicated supervisory wavelength channels in system 100 (see FIG. 1). The center frequency $f_c$ and bandwidth B of the shown transfer function 202 are such that a supervisory optical signal corresponding to wavelength channel $\lambda_1$ can pass through the narrow band-pass optical filter having this transfer function with little attenuation, whereas any of the optical signals corresponding to wavelength channels $\lambda_2$-$\lambda_{51}$ is rejected or significantly attenuated due to being outside of the bandwidth B.

A person of ordinary skill in the art will understand that a narrow band-pass optical filter corresponding to any of the additional dedicated supervisory wavelength channels (e.g., $\lambda_2$, FIG. 1) can similarly be spectrally aligned with the corresponding peak in spectrum 210.

In some embodiments, at least some of the narrow band-pass optical filters used in system 100 can be implemented as a part of the corresponding planar lightwave circuit. In a typical design, such a narrow band-pass optical filter does not employ a mirror configured to reflect, in an opposite direction, light applied to the filter by the corresponding supervisory optical circuit, e.g., if the light has a carrier frequency between $f_h$ and $f_1$ (see FIG. 2A). As used herein, the term "mirror" should be construed to cover, inter alia, conventional broadband mirrors, wavelength-selective reflectors, and Bragg reflectors.

In some other embodiments, at least some of the narrow band-pass optical filters used in system 100 can be implemented using mirrors, such as wavelength-selective reflectors and/or Bragg reflectors.

FIG. 3 shows a block diagram of an optical repeater $150_j$ according to an embodiment. Connections of optical repeater $150_j$ to optical fibers $140_{ja}$, $140_{jb}$, $140_{(j+1)a}$, and $140_{(j+1)b}$ of wet plant 104 are also shown in FIG. 3 to better indicate the relationship between the optical circuits of FIGS. 1 and 3. Optical amplifier (OA) $160_{ja}$ of optical repeater $150_j$ (also see FIG. 1) is located in an optical path $340_a$ that connects optical fibers $140_{ja}$ and $140_{(j+1)a}$. Similarly, optical amplifier (OA) $160_{jb}$ of optical repeater $150_j$ (also see FIG. 1) is located in an optical path $340_b$ that connects optical fibers $140_{jb}$ and $140_{(j+1)b}$. Optical repeater $150_j$ also includes a supervisory optical circuit 300 that optically couples optical paths $340_a$ and $340_b$ as described in more detail below.

Circuit 300 comprises (i) four 2×2 optical couplers that are labeled in FIG. 3 as $310_{1a}$, $310_{1b}$, $310_{2a}$, and $310_{2b}$, respectively, and (ii) four 2×1 optical couplers that are labeled in FIG. 3 as $384_a$, $384_b$, $330_a$, and $330_b$, respectively. Optical coupler $310_{1a}$ and optical coupler $310_{1b}$ are connected to one another by way of an optical fiber or waveguide 312. Optical coupler $310_{2a}$ and optical coupler $310_{2b}$ are connected to one another by way of an optical fiber or waveguide 316. Optical coupler $330_a$ and optical coupler $384_a$ are connected to one another by way of an optical fiber or waveguide 382. Optical coupler $330_b$ and optical coupler $384_b$ are connected to one another by way of an optical fiber or waveguide 386.

An NBPOF $320_{1a}$ is located between optical coupler $310_{1a}$ and optical coupler $384_b$. The transfer function 202 of NBPOF $320_{1a}$ has the center frequency $f_c$ corresponding to wavelength $\lambda_1$.

An NBPOF $320_{1b}$ is located between optical coupler $310_{1b}$ and optical coupler $384_a$. The transfer function 202 of NBPOF $320_{1b}$ has the center frequency $f_c$ corresponding to wavelength $\lambda_1$.

An NBPOF $320_{2a}$ is located between optical coupler $310_{2a}$ and optical coupler $384_b$. The transfer function 202 of NBPOF $320_{2a}$ has the center frequency $f_c$ corresponding to wavelength $\lambda_2$.

An NBPOF $320_{2b}$ is located between optical coupler $310_{2b}$ and optical coupler $384_a$. The transfer function 202 of NBPOF $320_{1b}$ has the center frequency $f_c$ corresponding to wavelength $\lambda_2$.

In operation, circuit 300 is configured to provide: (i) loop-back paths for the supervisory optical signals corresponding to wavelength channels $\lambda_1$ and $\lambda_2$; (ii) an optical pathway for the backscattered light of substantially any wavelength to cross from optical path $340_a$ to optical path $340_b$; and (iii) an optical pathway for the backscattered light of substantially any wavelength to cross from optical path $340_b$ to optical path $340_a$. Circuit 300 is also designed such that the loop-back paths and the backscattered-light pathways are substantially independent from each other. This characteristic of circuit 300 can be used to obtain certain engineering benefits, e.g., as described in more detail below.

In an example embodiment, circuit 300 can be a planar lightwave circuit or a part of a planar lightwave circuit.

In operation, circuit 300 provides the following loop-back paths for the supervisory optical signals corresponding to wavelength channels $\lambda_1$ and $\lambda_2$.

A portion of a supervisory optical signal of carrier wavelength $\lambda_2$ received from optical fiber $140_{ja}$ can be looped back into optical fiber $140_{jb}$, e.g., as follows. Optical path $340_a$ directs the optical signal received through optical fiber $140_{ja}$ to optical amplifier $160_{ja}$, where the latter undergoes optical amplification. The resulting amplified signal is directed from output port $362_a$ of optical amplifier $160_{ja}$ to optical coupler $310_{2a}$. Optical coupler $310_{2a}$ operates to cause the coupled optical signal to be directed through NBPOF $320_{2a}$ that passes the $\lambda_2$ component thereof and essentially stops all other spectral components thereof. The filtered $\lambda_2$ component is coupled by an optical coupler $384_b$ into optical fiber 386 that directs it to input port $358_b$ of optical amplifier $160_{jb}$ by way of optical coupler $330_b$. The resulting amplified signal of carrier wavelength $\lambda_2$ is then directed from output port $362_b$ of optical amplifier $160_{jb}$ to optical fiber $140_{jb}$.

A portion of a supervisory optical signal of carrier wavelength $\lambda_1$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical amplifier $160_{jb}$, where the latter undergoes optical amplification. The resulting amplified signal is directed from output port $362_b$ of optical amplifier $160_{jb}$ to optical coupler $310_{1b}$. Optical coupler $310_{1b}$ operates to cause the coupled optical signal to be directed through NBPOF $320_{1b}$ that passes the $\lambda_1$ component thereof and essentially stops all other spectral components thereof. The filtered $\lambda_1$ component is coupled by optical coupler $384_a$ into optical fiber 382 that directs it to input port $358_a$ of optical amplifier $160_{ja}$ by way of optical coupler $330_a$. The resulting amplified signal of carrier wavelength $\lambda_1$ is then directed from output port $362_a$ of optical amplifier $160_{ja}$ to optical fiber $140_{(j+1)a}$.

A portion of a supervisory optical signal of carrier wavelength $\lambda_1$ received from optical fiber $140_{ja}$ can be looped back into optical fiber $140_{jb}$, e.g., as follows. Optical path $340_a$ directs the optical signal received through optical fiber $140_{ja}$ to optical coupler $310_{1a}$. Optical coupler $310_{1a}$ operates to cause the coupled optical signal to be directed through NBPOF $320_{1a}$ that passes the $\lambda_1$ component thereof and essentially stops all other spectral components thereof. The filtered $\lambda_1$ component is coupled by optical coupler $384_b$ into optical fiber 386, which directs it to input port $358_b$ of optical amplifier $160_{jb}$ by way of optical coupler $330_b$. The resulting amplified signal of carrier wavelength $\lambda_1$ is then directed from output port $362_b$ of optical amplifier $160_{jb}$ to optical fiber $140_{jb}$.

A portion of a supervisory optical signal of carrier wavelength $\lambda_2$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical coupler $310_{2b}$. Optical coupler $310_{2b}$ operates to cause the coupled optical signal to be directed through NBPOF $320_{2b}$ that passes the $\lambda_2$ component thereof and essentially stops all other spectral components thereof. The filtered $\lambda_2$ component is coupled by optical coupler $384_a$ into optical fiber 382, which directs it to input port 358$_a$ of optical amplifier 160$_{ja}$ by way of optical coupler 330$_a$. The resulting amplified signal of carrier wavelength $\lambda_2$ is then directed from output port 362$_a$ of optical amplifier 160$_{ja}$ to optical fiber 140$_{(j+1)a}$.

In addition, circuit 300 provides the following optical pathways for the backscattered light of substantially any wavelength.

The backscattered light received from optical fiber 140$_{(j+1)a}$ can cross from optical path 340$_a$ to optical path 340$_b$ by first being coupled by optical coupler 310$_{2a}$ into optical fiber 316 and then being coupled by optical coupler 310$_{2b}$ out of optical fiber 316 and directed thereby to input port 358$_b$ of optical amplifier 160$_{jb}$.

The backscattered light received from optical fiber 140$_{jb}$ can cross from optical path 340$_b$ to optical path 340$_a$ by first being coupled by optical coupler 310$_{1b}$ into optical fiber (or optical waveguide) 312 and then being coupled by optical coupler 310$_{1a}$ out of optical fiber 312 and directed thereby to input port 358$_a$ of optical amplifier 160$_{ja}$.

In operation, ME unit 120$_1$ (FIG. 1) can use a supervisory optical signal corresponding to wavelength channel $\lambda_1$ to monitor the optical power at input port 358$_a$ of optical amplifier 160$_{ja}$. ME unit 120$_1$ (FIG. 1) can use a supervisory optical signal corresponding to wavelength channel $\lambda_2$ to monitor the optical power at output port 362$_a$ of optical amplifier 160$_{ja}$. Based on the measurement of the input and output optical powers, ME unit 120$_1$ can also determine and monitor over time the optical gain of optical amplifier 160$_{ja}$. ME unit 120$_1$ (FIG. 1) can further use circuit 300 to carry out in-band or out-of-band coherent-OTDR measurements in addition to the optical power monitoring, substantially without affecting the latter.

ME unit 120$_2$ (FIG. 1) can similarly use a supervisory optical signal corresponding to wavelength channel $\lambda_2$ to monitor the optical power at input port 358$_b$ of optical amplifier 160$_{jb}$. ME unit 120$_2$ (FIG. 1) can use a supervisory optical signal corresponding to wavelength channel $\lambda_1$ to monitor the optical power at output port 362$_b$ of optical amplifier 160$_{jb}$. Based on the measurement of the input and output optical powers, ME unit 120$_2$ can also determine and monitor over time the optical gain of optical amplifier 160$_{jb}$. ME unit 120$_2$ (FIG. 1) can further use circuit 300 to carry out in-band or out-of-band coherent-OTDR measurements in addition to the optical power monitoring, substantially without affecting the latter.

Figure 4:
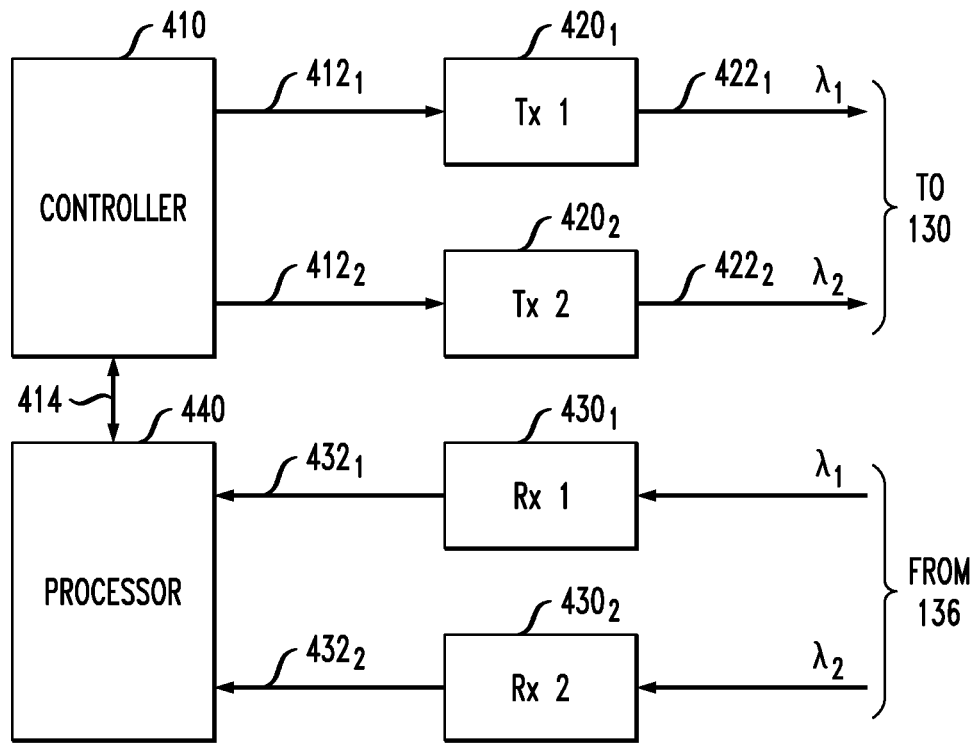
FIG. 4 shows a block diagram of an optical transceiver that can be used in the optical transport system of FIG. 1 according to an embodiment.

FIG. 4 shows a block diagram of an optical transceiver 400 that can be used in an ME unit 120 (FIG. 1) according to an embodiment. Transceiver 400 is a two-channel transceiver that is connected to wet plant 104 by way of a MUX 130 and a DMUX 136 as indicated in FIG. 4 (also see FIG. 1). The two channels of transceiver 400 have center wavelengths $\lambda_1$ and $\lambda_2$, respectively.

Transceiver 400 comprises optical transmitters 420$_1$ and 420$_2$ and optical receivers 430$_1$ and 430$_2$. Transmitter 420$_1$ and receiver 430$_1$ are configured to use the $\lambda_1$ wavelength channel. Transmitter 420$_2$ and receiver 430$_2$ are configured to use the $\lambda_2$ wavelength channel. Various embodiments of transmitter(s) 420 are described in more detail below in reference to FIGS. 5-10. In an example embodiment, receiver 430 is or comprises a photodetector (e.g., a photodiode).

Transceiver 400 further comprises an electronic controller 410 and a signal processor 440.

Controller 410 is configured to electrically drive transmitters 420$_1$ and 420$_2$ using control signals 412$_1$ and 412$_2$, respectively, each carrying a respective data sequence. In response to control signals 412$_1$ and 412$_2$, transmitters 420$_1$ and 420$_2$ generate modulated optical signals 422$_1$ and 422$_2$, respectively, that are applied to MUX 130. In an example embodiment, the modulation format can be ON/OFF keying (OOK) or amplitude-shift keying (ASK). The modulation rate used by transmitters 420$_1$ and 420$_2$ is typically much lower than the modulation rate of the payload wavelength channels (e.g., $\lambda_3$-$\lambda_{51}$, FIG. 2B) and can be in the kHz, MHz, or low GHz range.

In some embodiments, the modulation format used in transmitters 420$_1$ and 420$_2$ can be different from OOK and ASK and include some type of phase modulation.

In some embodiments, control signals 412$_1$ and 412$_2$ are configured to carry the same binary sequence. In some embodiments, control signals 412$_1$ and 412$_2$ are configured to carry different respective binary sequences. In some embodiments, control signal 412$_2$ is configured to carry the binary sequence that is an inverted version (wherein the bits are flipped) of the binary sequence carried by control signal 412$_1$.

Controller 410 is further configured to use a control signal 414 to provide/receive copies of the data sequences used for the generation of control signals 412$_1$ and 412$_2$ to/from processor 440.

A portion of optical signal 422$_1$ is looped back to the launch ME unit 120 by repeaters 150 of wet plant 104, e.g., as described above in reference to FIG. 3. A resulting optical signal 428$_1$ is received by optical receiver 430$_1$. A portion of optical signal 422$_2$ is also looped back to the launch ME unit 120 by repeaters 150 of wet plant 104, e.g., as described above in reference to FIG. 3. A resulting optical signal 428$_2$ is received by optical receiver 430$_2$. Receivers 430$_1$ and 430$_2$ then operate to convert the received optical signals 428$_1$ and 428$_2$ into the corresponding electrical signals 432$_1$ and 432$_2$, respectively.

Processor 440 is configured to process electrical signals 432$_1$ and 432$_2$ in a manner that enables the processor to extract therefrom the relevant performance parameters of repeaters 150 and wet plant 104. A person of ordinary skill in the art will understand that such processing may include computation of various correlation functions corresponding to signals 412$_1$, 412$_2$, 432$_1$, and 432$_2$ and/or other suitable signal-processing techniques known in the art of time-domain reflectometry.

As already indicated above, e.g., in reference to FIG. 2B, the monitoring wavelength channels, e.g., $\lambda_1$ and $\lambda_2$, coexist with the payload wavelength channels, e.g., $\lambda_3$-$\lambda_{51}$, in the same fiber of wet plant 104. As such, the monitoring wavelength channels can negatively impact the payload wavelength channels, e.g., through inter-channel interference and/or crosstalk. For example, non-linear crosstalk between an OOK-modulated monitoring wavelength channel and a quadrature-amplitude-modulated (QAM) payload wavelength channel is known to induce errors in the latter to the extent that can manifest itself as uncorrected blocks at the receiver even after the application of FEC decoding thereat. Various embodiments of transceiver 400 disclosed herein are designed to alleviate this and possibly other related problems in the state of the art through the use of depolarized light sources at transmitters 420$_1$ and 420$_2$. At least some embodiments of the disclosed light-depolarization schemes advantageously lend themselves to relatively inexpensive implementations while significantly reducing the occurrence uncorrected blocks at the receiver.

In some embodiments, at least one of transmitters 420$_1$ and 420$_2$ can be a tunable transmitter that can be tuned to a selected one of the monitoring wavelength channels, e.g., $\lambda_1$ or $\lambda_2$. In such embodiments, the selected monitoring wavelength channel can be changed as programmed, in accordance to a schedule, or by request. In some of such embodiments, one of transmitters $420_1$ and $420_2$ can be absent or disabled.

In some embodiments, a single transmitter can be used in place of transmitters $420_1$ and $420_2$. Example embodiments of such a single transmitter are described, e.g., in reference to FIGS. 9-10.

In some embodiments, at least one of receivers $430_1$ and $430_2$ can be a tunable receiver that can be tuned to a selected one of the monitoring wavelength channels, e.g., $\lambda_1$ or $\lambda_2$. In such embodiments, the selected monitoring wavelength channel can be changed as programmed, in accordance to a schedule, or by request. In some of such embodiments, one of receivers $430_1$ and $430_2$ can be absent or disabled.

Figure 5:
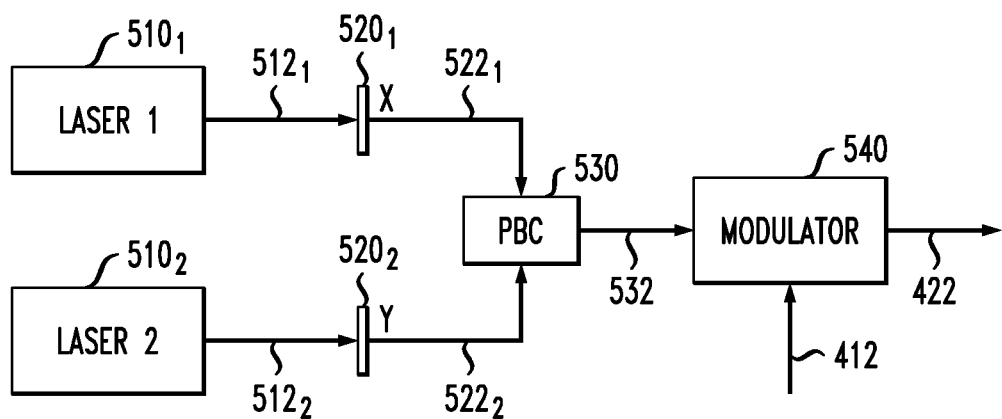
FIG. 5 shows a block diagram of an optical transmitter that can be used in the optical transceiver of FIG. 4 according to an embodiment.

FIG. 5 shows a block diagram of an optical transmitter 420 according to an embodiment. A respective instance of optical transmitter 420 shown in FIG. 5 can be used to implement each or one of transmitters $420_1$ and $420_2$ as explained in more detail below.

As shown in FIG. 5, optical transmitter 420 comprises lasers $510_1$ and $510_2$. Laser $510_1$ is configured to generate an output beam $512_1$ having a carrier frequency $f_a$. Laser $510_2$ is configured to generate an output beam $512_2$ having a carrier frequency $f_b$. The carrier frequencies are such that both of them are located within the spectral width B of the corresponding wavelength channel. For example, the carrier frequencies $f_a$ and $f_b$ can be selected to satisfy the following inequalities:

$$f_l < f_a < f_h \quad (1a)$$

$$f_l < f_b < f_h \quad (1b)$$

where $f_l$ and $f_h$ are the lower and higher boundaries, respectively, of the spectral width B (also see FIG. 2A). If the optical transmitter of FIG. 5 is used to implement transmitter $420_1$, then the center frequency $f_c$ of the spectral width B corresponds to wavelength $\lambda_1$. If the optical transmitter of FIG. 5 is used to implement transmitter $420_2$, then the center frequency $f_c$ of the spectral width B corresponds to wavelength $\lambda_2$.

The carrier frequencies $f_a$ and $f_b$ can further be selected to satisfy the following inequality:

$$|f_a - f_b| < \eta B \quad (2)$$

where $\eta$ is positive value smaller than one, and B is the spectral width of the corresponding wavelength channel. For example, in some embodiments, the value of $\eta$ (expressed in percentage points) can be 50%. In some other embodiments, the value of $\eta$ can be, e.g., 30%, 10%, or 5%. In some embodiments, the value of $\eta B$ can be, e.g., 10 GHz, 5 GHz, or 1 GHz.

In some embodiments, at least one of lasers $510_1$ and $510_2$ can be controllably tunable in a manner that enables the laser to change its output carrier wavelength while still satisfying Eqs. (1a) and (1b). In some embodiments, both lasers $510_1$ and $510_2$ can be controllably tunable in a manner that enables both lasers to change their output carrier wavelengths while also satisfying Eq. (2).

In some other embodiments, both lasers $510_1$ and $510_2$ can be controllably tunable in a manner that enables the corresponding transmitter 420 to change its channel, e.g., between the monitoring wavelength channels $\lambda_1$ and $\lambda_2$.

As shown in FIG. 5, optical transmitter 420 further comprises polarization filters $520_1$ and $520_2$ and a polarization beam combiner (PBC) 530. Polarization filter $520_1$ is configured to filter optical beam $512_1$ such that a resulting filtered optical beam $522_1$ has a first (e.g., X) polarization. Polarization filter $520_2$ is configured to filter optical beam $512_2$ such that a resulting filtered optical beam $522_2$ has a second (e.g., Y) polarization that is orthogonal to the first polarization. PBC 530 is configured to generate an optical beam 532 by combining optical beams $522_1$ and $522_2$.

In an example embodiment, lasers $510_1$ and $510_2$ and polarization filters $520_1$ and $520_2$ may be configured to operate such that optical beams $522_1$ and $522_2$ have approximately equal optical powers.

In some embodiments, polarization filters $520_1$ and $520_2$ can be replaced by the corresponding polarization rotators or polarization controllers. In some other embodiments, polarization filters $520_1$ and $520_2$ can be parts of lasers $510_1$ and $510_2$, respectively. In some embodiments, polarization filters $520_1$ and $520_2$ may not be needed.

As shown in FIG. 5, optical transmitter 420 further comprises an optical modulator 540. In operation, modulator 540 modulates optical beam 532 in response to a control signal 412 (also see FIG. 4). The resulting modulated optical beam is an optical signal 422 (also see FIG. 4).

Through simulation and experimental measurements, it has been confirmed that the use of the shown optical transmitter(s) 420 in ME unit 120 can advantageously reduce the number of uncorrected blocks at the corresponding SLTE(s) 110 compared to that observed under typical conventional monitoring schemes.

Figure 6:
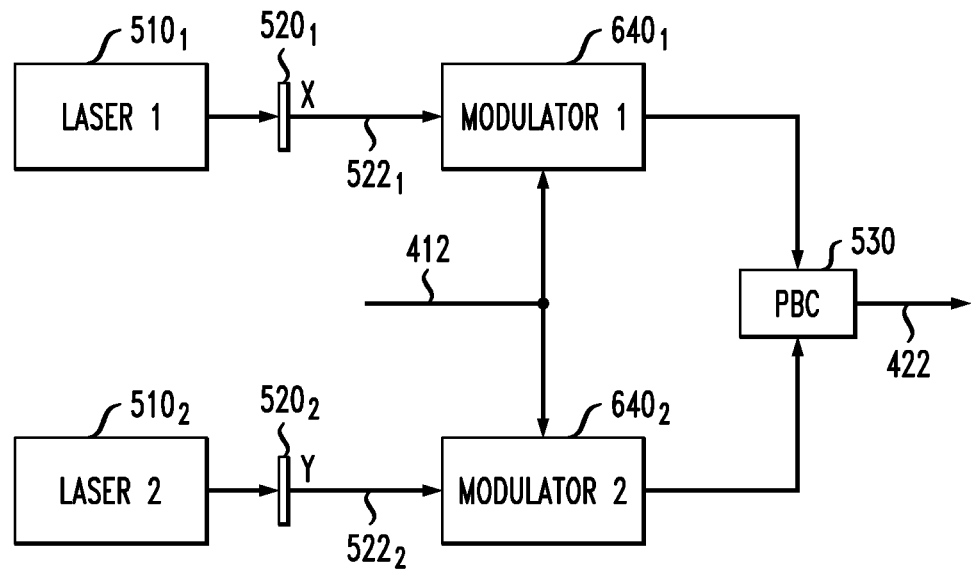
FIG. 6 shows a block diagram of an optical transmitter that can be used in the optical transceiver of FIG. 4 according to another embodiment.

FIG. 6 shows a block diagram of an optical transmitter 420 according to another embodiment. A respective instance of optical transmitter 420 shown in FIG. 6 can be used to implement each or one of transmitters $420_1$ and $420_2$. The embodiment of optical transmitter 420 shown in FIG. 6 uses many of the same elements that have already been described in reference to FIG. 5. As such, the description of FIG. 6 provided below mainly focuses on the differences between the embodiments of FIGS. 5 and 6.

In the embodiment of FIG. 6, modulator 540 is replaced by optical modulators $640_1$ and $640_2$ that are placed upstream from PBC 530 as indicated in FIG. 6. More specifically, modulator $640_1$ is configured to modulate optical beam $522_1$ in response to a control signal 412 (also see FIG. 4). Modulator $640_2$ is similarly configured to modulate optical beam $522_2$ in response to the same control signal 412. PBC 530 is configured to combine the resulting modulated optical beams $642_1$ and $642_2$ generated by modulators $640_1$ and $640_2$, respectively. The combined optical beam generated by PBC 530 is an optical signal 422 (also see FIG. 4).

Figure 7:
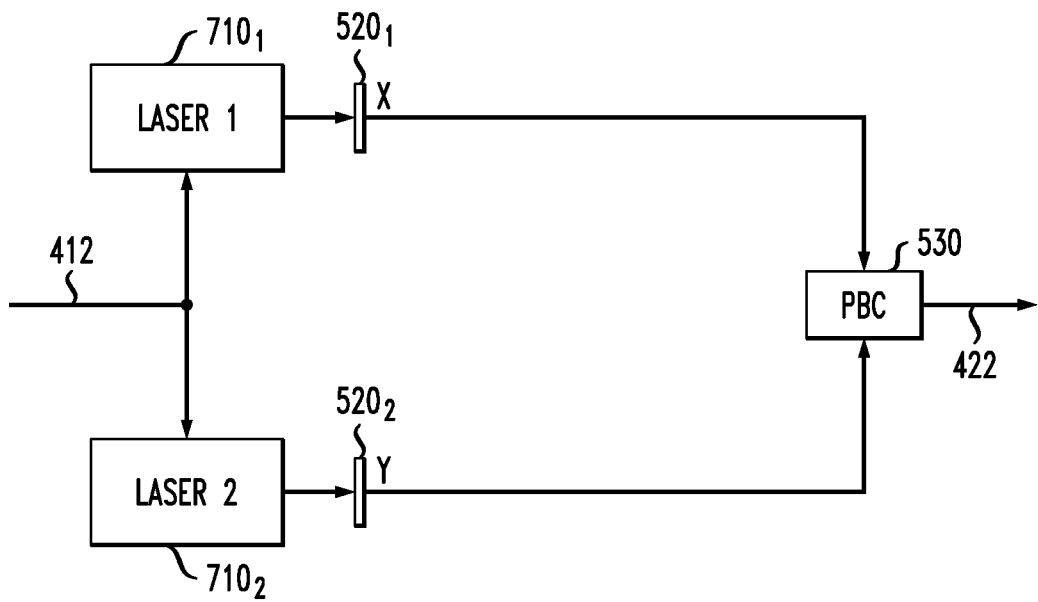
FIG. 7 shows a block diagram of an optical transmitter that can be used in the optical transceiver of FIG. 4 according to yet another embodiment.

FIG. 7 shows a block diagram of an optical transmitter 420 according to yet another embodiment. A respective instance of optical transmitter 420 shown in FIG. 7 can be used to implement each or one of transmitters $420_1$ and $420_2$. The embodiment of optical transmitter 420 shown in FIG. 7 is a further modification in which (i) laser $510_1$ and modulator $640_1$ (see FIG. 6) are replaced by a directly modulated laser $710_1$ and (ii) laser $510_2$ and modulator $640_2$ (see FIG. 6) are replaced by another directly modulated laser $710_2$. Lasers $710_1$ and $710_2$ are configured to output optical signals having carrier frequencies $f_a$ and $f_b$ (see Eqs. (1)-(2)), respectively, in response to the same control signal 412.

FIG. 8 shows a block diagram of an optical transmitter 420 according to yet another embodiment. A respective instance of optical transmitter 420 shown in FIG. 8 can be used to implement each or one of transmitters $420_1$ and $420_2$.

As shown in FIG. 8, optical transmitter 420 comprises an amplified-spontaneous-emission source 810.

A person of ordinary skill in the pertinent art will understand that, in a laser medium characterized by a relatively large optical gain, the luminescence from spontaneous emission can be amplified to a relatively high power level. This amplified luminescence is typically referred to as the amplified spontaneous emission (ASE). For example, ASE occurs in many types of lasers, even when the laser is operated below the lasing threshold. The ASE is typically interpreted as being the light generated at wavelengths other than the lasing wavelength(s) of the corresponding light source.

Some of the properties of ASE that may be pertinent to this description are as follows:

Although the luminescence from spontaneous emission originally goes in all spatial directions, the ASE can be strongly directional for gain media with a large aspect ratio, such as a fiber laser or a fiber amplifier.

The ASE light is typically broadband. As such, the ASE can reach a relatively high power level in any wavelength region where the gain of the corresponding optical medium is sufficiently high. For example, an Ytterbium-doped fiber amplifier pumped at 940 nm can exhibit high ASE levels in the spectral region between 980 nm and 1120 nm.

When ASE co-propagates with a useful optical signal, it constitutes a broadband noise for that optical signal.

The ASE is often stronger in a direction opposite to that of the pump light.

The ASE light typically has a very low degree of polarization—that is, all light polarizations in the ASE have approximately the same optical power.

In lasers and high-gain optical amplifiers, the ASE is usually an unwanted effect, e.g., because it tends to limit the achievable gain and/or cause gain saturation when the pump power is being increased. In contrast, in the embodiment of optical transmitter 420 shown in FIG. 8, the ASE is specifically employed and leveraged for the purpose of monitoring the performance of wet plant 104.

Through simulation and experimental measurements, it has been confirmed that the use of ASE source 810 in ME unit 120 can advantageously reduce the number of uncorrected blocks at the corresponding SLTE(s) 110 compared to that observed under typical conventional monitoring schemes.

In an example embodiment, ASE source 810 can be implemented using an optical amplifier configured to operate such that (i) a pump port 804 thereof receives an appropriate pump signal and (ii) a signal-input port 802 thereof is blocked and does not receive any optical input. Under these operating conditions, the light emitted through a signal-output port 812 of the optical amplifier is dominated by the ASE. Depending on the embodiment, the optical amplifier used to implement ASE source 810 can be, for example, (i) a fiber amplifier, such as an Erbium-doped fiber amplifier (EDFA), Ytterbium-doped fiber amplifier (YDFA), and Erbium-Ytterbium-doped fiber amplifier (EYDFA); (ii) a non-polarized semiconductor optical amplifier (SOA); or (iii) a Raman amplifier. Depending on the amplifier type, the pump signal applied to pump port 804 can be an optical pump signal or an electrical pump signal.

As shown in FIG. 8, optical transmitter 420 further comprises an NBPOF 820 connected to signal-output port 812 of ASE source 810 as indicated in FIG. 8. In operation, NBPOF 820 spectrally limits the broadband ASE generated by ASE source 810, thereby generating a corresponding narrow-band ASE signal 822.

In an example embodiment, the transfer function of NBPOF 820 can be similar to transfer function 202 (see FIG. 2A). If the optical transmitter of FIG. 8 is used to implement transmitter 420$_1$, then the center frequency $f_c$ of the transfer function of NBPOF 820 corresponds to wavelength $\lambda_1$. If the optical transmitter of FIG. 8 is used to implement transmitter 420$_2$, then the center frequency $f_c$ of the transfer function of NBPOF 820 corresponds to wavelength $\lambda_2$. The bandwidth B of the transfer function of NBPOF 820 can be, e.g., smaller than about 50 GHz. In some embodiments, the bandwidth B of the transfer function of NBPOF 820 can be approximately 20 GHz or approximately 10 GHz.

In some embodiments, NBPOF 820 can be controllably tunable in a manner that enables the corresponding transmitter 420 to change its channel, e.g., between the monitoring wavelength channels $\lambda_1$ and $\lambda_2$. In such embodiments, the center frequency $f_c$ of the transfer function of NBPOF 820 can be changed while the bandwidth B of the transfer function remains approximately constant.

An optical amplifier 830 is configured to amplify narrow-band ASE signal 822 and apply a resulting optical output signal 832 to optical modulator 540. Modulator 540 is configured to modulate optical signal 832 in response to a control signal 412, e.g., as described above in reference to FIG. 5. The resulting modulated optical signal is an optical signal 422 (also see FIG. 4).

In an example embodiment, optical amplifier 830 can be any suitable optical amplifier that does not cause optical output signal 832 to have any significant degree of polarization. For example, optical amplifier 830 can be such that optical output signal 832 has the same degree of polarization as narrow-band ASE signal 822 or such that optical output signal 832 has a very low degree of polarization. In various embodiments, optical amplifier 830 can be, for example, (i) a fiber amplifier; (ii) a non-polarized SOA; or (iii) a Raman amplifier. Depending on the amplifier type, a pump signal applied to a pump port 824 of optical amplifier 830 can be an optical pump signal or an electrical pump signal.

FIG. 9 shows a block diagram of an optical transmitter 900 that can be used in optical transceiver 400 (FIG. 4) according to yet another embodiment. More specifically, transmitter 900 is a two-channel optical transmitter that can be used to implement both transmitters 420$_1$ and 420$_2$.

Optical transmitter 900 is similar to optical transmitter 420 of FIG. 8 in that optical transmitter 900 similarly uses ASE source 810 and optical amplifier 830. However, optical transmitter 900 differs from optical transmitter 420 of FIG. 8 in that optical transmitter 900 has a wavelength blocker 920 placed between ASE source 810 and optical amplifier 830 instead of NBPOF 820 used in transmitter 420 of FIG. 8. In an example embodiment, wavelength blocker 920 is configured to pass through the light corresponding to two spectral bands and to block light of other wavelengths. The first of the two spectral bands includes wavelength $\lambda_1$. The second of the two spectral bands includes wavelength $\lambda_2$. Each of the two spectral bands may have a spectral width, e.g., on the order of 1 nm. As a result, an optical output signal 932 generated by optical amplifier 830 in optical transmitter 900 carries the amplified ASE light spectrally located in the vicinity of both wavelengths $\lambda_1$ and $\lambda_2$.

An optical beam splitter 940 operates to split optical signal 932 into two portions and direct (i) a first portion 942$_1$ to NBPOF 820$_1$ and (ii) a second portion 942$_2$ to NBPOF 820$_2$. In an example embodiment, splitter 940 can be a 3-dB power splitter. The center frequency $f_c$ of the transfer function of NBPOF 820$_1$ corresponds to wavelength $\lambda_1$. The center frequency $f_c$ of the transfer function of NBPOF 820$_2$ corresponds to wavelength $\lambda_2$.

In some embodiments, wavelength blocker 920 and NBPOFs 820$_1$ and 820$_2$ can be tunable in a manner that enables transmitter 900 to change the center wavelengths (frequencies) of its monitoring wavelength channels.

Modulator $540_1$ is configured to modulate an optical output signal $944_1$ of NBPOF $820_1$ in response to a control signal $412_1$. Modulator $540_2$ is similarly configured to modulate an optical output signal $944_2$ of NBPOF $820_2$ in response to a control signal $412_2$. The resulting modulated optical signals are optical signals $422_1$ and $422_2$ (also see FIG. 4).

Figure 10:
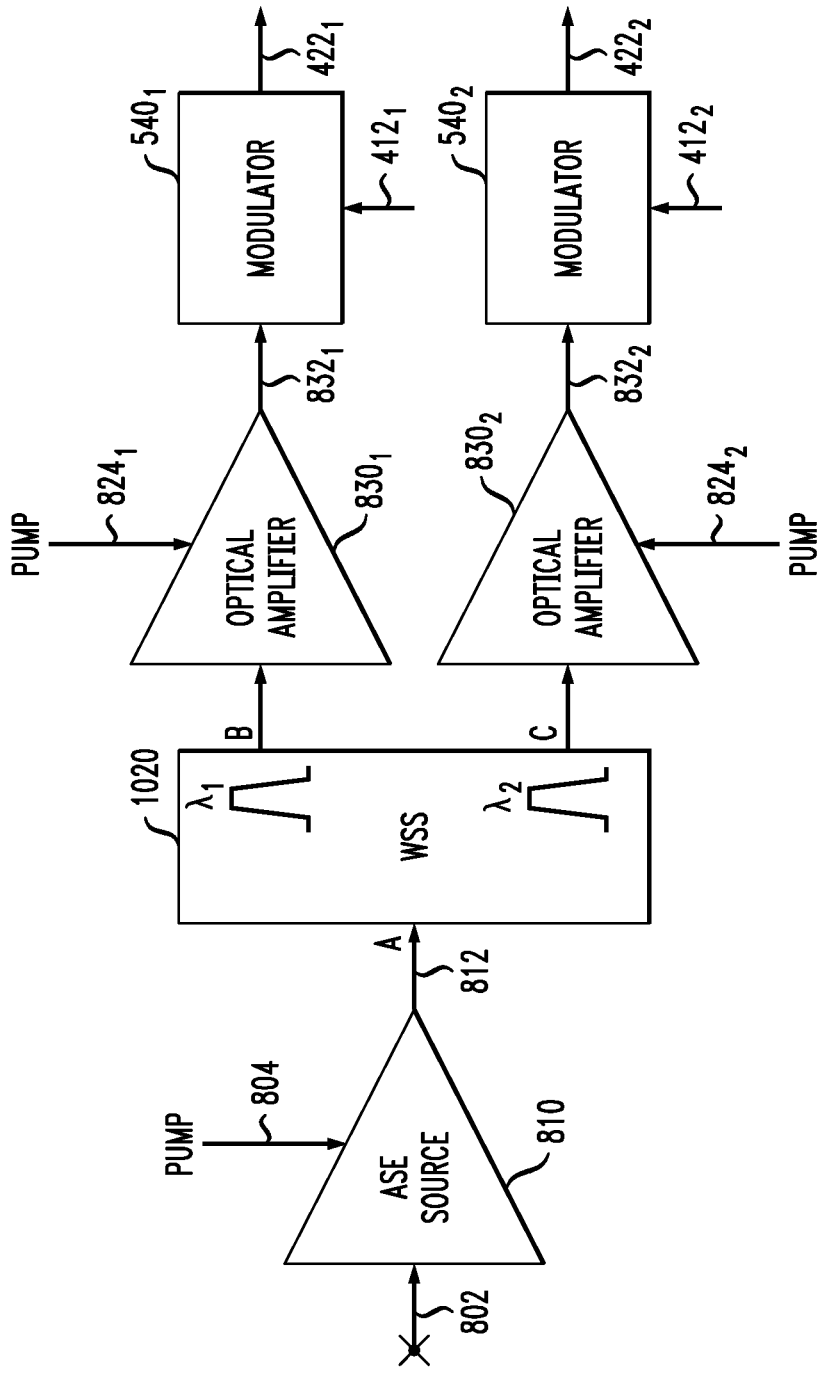
FIG. 10 shows a block diagram of an optical transmitter that can be used in the optical transceiver of FIG. 4 according to yet another embodiment.

FIG. 10 shows a block diagram of an optical transmitter 1000 that can be used in optical transceiver 400 (FIG. 4) according to yet another embodiment. Similar to transmitter 900, transmitter 1000 is a two-channel optical transmitter that can be used to implement both transmitters $420_1$ and $420_2$. Transmitter 1000 can be viewed as being a modification of transmitter 900 according to which the circuit portion between ASE source 810 and modulators $540_1$ and $540_2$ is replaced by a wavelength-selective switch (WSS) 1020 and optical amplifiers $830_1$ and $830_2$ connected as indicated in FIG. 10 (also see FIG. 9).

In an example embodiment, WSS 1020 can be a 1×2 WSS having an input port A and output ports B and C. Input port A is connected to signal-output port 812 of ASE source 810. Output ports B and C are connected to the signal-input ports of optical amplifiers $830_1$ and $830_2$, respectively. The transfer function between ports A and B can be similar to the transfer function of NBPOF $820_1$ (see FIG. 9). The transfer function between ports A and C can be similar to the transfer function of NBPOF $820_2$ (see FIG. 9).

In some embodiments, WSS 1020 can be programmable in a manner that enables the WSS to change the transfer functions between ports A and B and/or between ports A and C. This feature can be used, e.g., to change the center wavelengths (frequencies) of the monitoring wavelength channels used by the corresponding transmitter 1000.

In an example embodiment, each of optical amplifiers $830_1$ and $830_2$ can be a nominal copy of optical amplifier 830 (FIGS. 8-9) or be a functionally analogous device. In operation, an optical output signal $832_1$ generated by optical amplifier $830_1$ carries the amplified ASE light spectrally located within the $\lambda_1$ wavelength channel. An optical output signal $832_2$ generated by optical amplifier $830_2$ similarly carries the amplified ASE light spectrally located within the $\lambda_2$ wavelength channel.

In transmitter 1000, modulator $540_1$ is configured to modulate optical signal $832_1$ in response to a control signal $412_1$. Modulator $540_2$ is similarly configured to modulate optical signal $832_2$ in response to a control signal $412_2$. The resulting modulated optical signals are optical signals $422_1$ and $422_2$ (also see FIG. 4).

According to an example embodiment disclosed above, e.g., in the summary section and/or in reference to any one or any combination of some or all of FIGS. 1-10, provided is an apparatus (e.g., 100 or 102, FIG. 1) comprising: an optical output (e.g., $140_{1a}$, FIG. 1) and an optical input (e.g., $140_{1b}$, FIG. 1); a first optical transmitter (e.g., $420_1$, FIGS. 4, 8; 900, FIG. 9; 1000, FIG. 10) connected to the optical output to transmit therethrough a first modulated optical signal carrying light spectrally located within a bandwidth of a first wavelength channel (e.g., $\lambda_1$, FIG. 4); and a first optical receiver (e.g., $430_1$, FIG. 4) connected to the optical input to receive therethrough a delayed portion of the first modulated optical signal; and wherein the first optical transmitter comprises: a first light source (e.g., 810, FIGS. 8-10) configured to generate light comprising amplified spontaneous emission (e.g., 812, FIGS. 8-10); a first band-pass filter (e.g., 820, FIGS. 8, 9; 1020, FIG. 10) configured to generate a first optical beam by passing through a spectral portion of the amplified spontaneous emission located within the bandwidth of the first wavelength channel; and a first optical modulator (e.g., 540, FIGS. 8-10) configured to generate the first modulated optical signal by modulating the first optical beam.

In some embodiments of the above apparatus, the apparatus further comprises an optical repeater (e.g., 150, FIG. 1) optically connected to the optical output and the optical input, the optical repeater including an optical circuit (e.g., 300, FIG. 3) configured to direct toward the optical input a portion of the first modulated optical signal received from the optical output.

In some embodiments of any of the above apparatus, the apparatus further comprises a second optical transmitter (e.g., $110_1$, FIG. 1) connected to the optical output to transmit therethrough a plurality of second modulated optical signals, each carrying light spectrally located within a bandwidth of a respective one of second wavelength channels (e.g., $\lambda_3$-$\lambda_n$, FIG. 1).

In some embodiments of any of the above apparatus, the first optical modulator is configured to modulate the first optical beam using ON/OFF keying or amplitude-shift keying. In some embodiments of any of the above apparatus, the second optical transmitter is configured to generate at least some of the second modulated optical signals using quadrature-phase-shift keying or quadrature-amplitude modulation.

In some embodiments of any of the above apparatus, the apparatus further comprises: a second optical transmitter (e.g., $420_2$, FIG. 4) connected to the optical output to transmit therethrough a second modulated optical signal carrying light spectrally located within a bandwidth of a second wavelength channel (e.g., $\lambda_2$, FIG. 4); and a second optical receiver (e.g., $430_2$, FIG. 4) connected to the optical input to receive therethrough a delayed portion of the second modulated optical signal; and wherein the second optical transmitter comprises: a second light source (e.g., 810, FIG. 8) configured to generate light comprising amplified spontaneous emission (e.g., 812, FIG. 8); a second band-pass filter (e.g., 820, FIG. 8) configured to generate a second optical beam (e.g., 822, FIG. 8) by passing through a spectral portion of the amplified spontaneous emission located within the bandwidth of the second wavelength channel; and a second optical modulator (e.g., 540, FIG. 8) configured to generate the second modulated optical signal by modulating the second optical beam.

In some embodiments of any of the above apparatus, the first optical modulator is configured to modulate the first optical beam in response to a first bit sequence (e.g., $412_1$, FIG. 4); and wherein the second optical modulator is configured to modulate the second optical beam in response to a second bit sequence (e.g., $412_2$, FIG. 4) that is different from the first bit sequence.

In some embodiments of any of the above apparatus, the second bit sequence is an inverted version of the first bit sequence.

In some embodiments of any of the above apparatus, the first optical transmitter (e.g., 900, FIG. 9) is further connected to the optical output to transmit therethrough a second modulated optical signal carrying light spectrally located within a bandwidth of a second wavelength channel (e.g., $\lambda_2$, FIG. 4); and wherein the first optical transmitter further comprises: a second band-pass filter (e.g., $820_2$, FIG. 9) configured to generate a second optical beam by passing through a spectral portion of the amplified spontaneous emission located within the bandwidth of the second wavelength channel; and a second optical modulator (e.g., $540_2$, FIG. 9) configured to generate the second modulated optical signal by modulating the second optical beam.

In some embodiments of any of the above apparatus, the apparatus further comprises a second optical receiver (e.g., $430_2$, FIG. 4) connected to the optical input to receive therethrough a delayed portion of the second modulated optical signal.

In some embodiments of any of the above apparatus, the first optical modulator is configured to modulate the first optical beam in response to a first bit sequence (e.g., $412_1$, FIG. 4); and wherein the second optical modulator is configured to modulate the second optical beam in response to a second bit sequence (e.g., $412_2$, FIG. 4) that is an inverted version of the first bit sequence.

In some embodiments of any of the above apparatus, the first optical transmitter (e.g., 1000, FIG. 10) is further connected to the optical output to transmit therethrough a second modulated optical signal carrying light spectrally located within a bandwidth of a second wavelength channel (e.g., $\lambda_2$, FIG. 4); and wherein the first optical transmitter comprises: a wavelength-selective switch that includes the first band-pass filter and a second band-pass filter, the second band-pass filter being configured to generate a second optical beam (e.g., at C, FIG. 10) by passing through a spectral portion of the amplified spontaneous emission located within the bandwidth of the second wavelength channel; and a second optical modulator (e.g., $540_2$, FIG. 10) configured to generate the second modulated optical signal by modulating the second optical beam.

In some embodiments of any of the above apparatus, the first optical receiver is further connected to the optical input to receive therethrough a delayed portion of the second modulated optical signal; and wherein the first optical receiver is tunable to select for detection therein the delayed portion of the first modulated optical signal or the delayed portion of the second modulated optical signal.

In some embodiments of any of the above apparatus, the first light source comprises an optical amplifier (e.g., 810, FIG. 8) having a pump port (e.g., 804, FIG. 8) and a signal-input port (e.g., 802, FIG. 8); and wherein the signal-input port is blocked to receive no optical input.

In some embodiments of any of the above apparatus, the optical amplifier comprises at least one of a fiber amplifier, a semiconductor optical amplifier, and a Raman amplifier.

In some embodiments of any of the above apparatus, the pump port is configured to receive an optical pump signal.

In some embodiments of any of the above apparatus, the pump port is configured to receive an electrical pump signal.

In some embodiments of any of the above apparatus, the first optical transmitter further comprises an optical amplifier (e.g., 830, FIG. 8) connected between the first light source and the first optical modulator.

In some embodiments of any of the above apparatus, the first optical transmitter further comprises a wavelength blocker (e.g., 920, FIG. 9) connected between the first light source and the optical amplifier.

In some embodiments of any of the above apparatus, the first band-pass filter is tunable.

According to another example embodiment disclosed above, e.g., in the summary section and/or in reference to any one or any combination of some or all of FIGS. 1-10, provided is an apparatus (e.g., 100 or 102, FIG. 1) comprising: an optical output (e.g., $140_{1a}$, FIG. 1) and an optical input (e.g., $140_{1b}$, FIG. 1); a first optical transmitter (e.g., $420_1$, FIG. 4) connected to the optical output to transmit therethrough a first modulated optical signal carrying light spectrally located within a bandwidth of a first wavelength channel (e.g., $\lambda_1$, FIG. 4); and a first optical receiver (e.g., $430_1$, FIG. 4) connected to the optical input to receive therethrough a delayed portion of the first modulated optical signal; and wherein the first optical transmitter comprises: a first laser (e.g., $510_1$, FIG. 5) configured to generate a first optical beam (e.g., $522_1$, FIG. 5) having a first carrier wavelength within the bandwidth of the first wavelength channel, the first optical beam having a first (e.g., X, FIG. 5) polarization; and a second laser (e.g., $510_2$, FIG. 5) configured to generate a second optical beam (e.g., $522_2$, FIG. 5) having a second carrier wavelength within the bandwidth of the first wavelength channel, the first optical beam having a second (e.g., Y, FIG. 5) polarization that is orthogonal to the first polarization; and wherein the first optical transmitter is configured to generate the first modulated optical signal using the first and second optical beams.

In some embodiments of the above apparatus, the apparatus further comprises an optical repeater (e.g., 150, FIG. 1) optically connected to the optical output and the optical input, the optical repeater including an optical circuit (e.g., 300, FIG. 3) configured to direct toward the optical input a portion of the first modulated optical signal received from the optical output.

In some embodiments of any of the above apparatus, the apparatus further comprises a second optical transmitter (e.g., $110_1$, FIG. 1) connected to the optical output to transmit therethrough a plurality of second modulated optical signals, each carrying light spectrally located within a bandwidth of a respective one of second wavelength channels (e.g., $\lambda_3$-$\lambda_n$, FIG. 1).

In some embodiments of any of the above apparatus, each of the first and second lasers is a directly modulated laser; and wherein the first optical transmitter further comprises a polarization beam combiner (e.g., 530, FIG. 7) configured to generate the first modulated optical signal by combining the first and second optical beams.

In some embodiments of any of the above apparatus, the first optical transmitter further comprises: a first polarization controller (e.g., $510_1$, FIG. 5) optically coupled to the first laser and configured to cause the first optical beam to have the first polarization; and a second polarization controller (e.g., $510_2$, FIG. 5) optically coupled to the second laser and configured to cause the second optical beam to have the second polarization.

In some embodiments of any of the above apparatus, the first optical transmitter further comprises: a polarization beam combiner (e.g., 530, FIG. 5) configured to generate a third optical beam by combining the first and second optical beams; and an optical modulator (e.g., 540, FIG. 5) configured to generate the first modulated optical signal by modulating the third optical beam.

In some embodiments of any of the above apparatus, at least one of the first laser and the second laser is tunable.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
   an optical output and an optical input;
   a first optical transmitter connected to the optical output to transmit therethrough a first modulated optical signal carrying light spectrally located within a bandwidth of a first wavelength channel; and
   a first optical receiver connected to the optical input to receive therethrough a delayed portion of the first modulated optical signal; and
   wherein the first optical transmitter comprises:
      a first light source configured to generate light comprising amplified spontaneous emission;
      a first band-pass filter configured to generate a first optical beam by passing through a spectral portion of the amplified spontaneous emission located within the bandwidth of the first wavelength channel; and
      a second band-pass filter configured to generate a second optical beam by passing through a spectral portion of the amplified spontaneous emission located within a bandwidth of a second wavelength channel; and a first optical modulator configured to generate the first modulated optical signal by modulating the first optical beam.

2. The apparatus of claim 1, further comprising an optical repeater optically connected to the optical output and the optical input, the optical repeater including an optical circuit configured to direct toward the optical input a portion of the first modulated optical signal received from the optical output.

3. The apparatus of claim 1, further comprising a second optical transmitter connected to the optical output to transmit therethrough a plurality of second modulated optical signals, each carrying light spectrally located within a bandwidth of a respective one of additional wavelength channels.

4. The apparatus of claim 1, wherein the first band-pass filter is tunable.

5. The apparatus of claim 1, wherein the first optical transmitter further comprises an optical amplifier connected between the first light source and the first optical modulator.

6. The apparatus of claim 5, wherein the first optical transmitter further comprises a wavelength blocker connected between the first light source and the optical amplifier.

7. The apparatus of claim 1,
wherein the first light source comprises an optical amplifier having a pump port and a signal-input port; and
wherein the signal-input port is blocked.

8. The apparatus of claim 7, wherein the optical amplifier comprises at least one of a fiber amplifier, a semiconductor optical amplifier, and a Raman amplifier.

9. The apparatus of claim 7, wherein the pump port is configured to receive an optical pump signal.

10. The apparatus of claim 7, wherein the pump port is configured to receive an electrical pump signal.

11. The apparatus of claim 1,
wherein the first optical transmitter is further connected to the optical output to transmit therethrough a second modulated optical signal carrying light spectrally located within the bandwidth of the second wavelength channel; and
wherein the first optical transmitter further comprises a second optical modulator configured to generate the second modulated optical signal by modulating the second optical beam.

12. The apparatus of claim 11, further comprising a second optical receiver connected to the optical input to receive therethrough a delayed portion of the second modulated optical signal.

13. The apparatus of claim 11,
wherein the first optical modulator is configured to modulate the first optical beam in response to a first bit sequence; and
wherein the second optical modulator is configured to modulate the second optical beam in response to a second bit sequence that is an inverted version of the first bit sequence.

14. The apparatus of claim 1,
wherein the first optical transmitter is further connected to the optical output to transmit therethrough a second modulated optical signal carrying light spectrally located within the bandwidth of the second wavelength channel; and
wherein the first optical transmitter comprises:
a wavelength-selective switch that includes the first band-pass filter and the second band-pass filter; and
a second optical modulator configured to generate the second modulated optical signal by modulating the second optical beam.

15. The apparatus of claim 14,
wherein the first optical receiver is further connected to the optical input to receive therethrough a delayed portion of the second modulated optical signal; and
wherein the first optical receiver is tunable to select for detection therein the delayed portion of the first modulated optical signal or the delayed portion of the second modulated optical signal.

* * * * *